3,407,142
HEAT TRANSFER FLUID

Robert S. McCord, Pacific Palisades, Calif., assignor, by mesne assignments, to McDonnell Douglas Corporation, Santa Monica, Calif., a corporation of Maryland
No Drawing. Filed Mar. 30, 1965, Ser. No. 444,040
12 Claims. (Cl. 252—78)

ABSTRACT OF THE DISCLOSURE

Heat transfer composition consisting essentially of a tetraalkyl orthosilicate having alkyl groups each containing from 5 to 6 carbon atoms, and a small proportion between about 2 and about 7% by weight of the composition, of a polyalkylene glycol material, preferably a polyalkylene glycol diether, such composition having low viscosity at low temperature, i.e., less than about 250 centistokes at −65° F., good hydrolytic stability and fire resistance, and a reduced shrinkage effect on rubber-O-ring seals.

---

This invention relates to a novel fluid heat transfer medium, and is especially concerned with the provision of novel cooling fluids designed particularly for use at very low temperatures, especially in aircraft and electronic systems.

A major problem in the operation of electrical computers, radar equipment, and life-support systems in aircraft, and the like, is the removal of heat energy. Generally, this is accomplished by circulating a liquid heat transfer medium or fluid from the hot area to a heat sink and back again. This problem is particularly severe where temperatures of operation can range from −40° F. down to as low as about −100° F.

In low temperature operations of this type, it has been found from experience that not only is it necessary that a liquid heat transfer medium or liquid coolant have a high specific heat and high thermal conductivity, but of even greater importance, such fluids must have a low viscosity, since it governs the effort required to pump the fluid. Not only is the available pumping energy limited, for example, in most airborne systems, but since ultimately the pumping energy must also be removed as heat from the circulating fluid, it further taxes the heat sink. In addition to low viscosity, non-volatility is desirable so that local boiling at hot spots or cavitation in the pump will not occur. Further, the heat transfer fluid employed in such systems must have high hydrolytic and thermal stability, a minimum adverse effect on materials of construction with which it comes into contact, such as aluminum or other metals, and rubber seals of the type customarily used in aircraft cooling systems, and of particular importance, the fluid should have good fire resistance. It is of particular importance that if spilled upon electrical insulation, the fluid should not harm the insulation or cause electrical short circuit, or in any way change the electrical characteristics of the system.

One object of the invention is the provision of fluids operable as a heat transfer medium, particularly as a cooling medium, for use over a wide temperature range.

Another object is to provide a heat transfer fluid useful especially in the operation of aircraft and electronic components.

Another object is the provision of a cooling medium, characterized by having low viscosity at low temperature, low volatility, good hydrolytic and thermal stability and fire resistance, and which is relatively inert to structural components and materials of construction.

A still further object is the provision of a silicate ester-based fluid designed for use over a wide temperature range of the order of −65° F. to 300° F., and particularly useful as a circulating liquid coolant where low viscosity, wide liquid range, and excellent stability are desired.

A further particular object is the provision of a liquid cooling medium having a sufficiently low viscosity to be operable at temperatures at and below −65° F., e.g., down to about −100° F., and especially having a kinematic viscosity less than 250 centistokes at −65° F.

Yet another object is to provide a cooling fluid in the form of a silicate ester-based fluid which has a minimum shrinkage effect on rubber O-ring seals employed in cooling liquid systems.

Other objects and advantages will be apparent from the following description of the invention.

I have discovered that fluid compositions meeting the above-noted requirements and achieving the above objects are provided by mixtures consisting essentially of a tetraalkyl orthosilicate having alkyl groups each containing from 5 to 6 carbon atoms, and a small proportion between about 2 and about 7% by weight of the composition, of a polyalkylene glycol material, preferably a polyalkylene glycol diether. Of particular significance, the cooling fluid compositions of the invention have low viscosity at low temperature, i.e., less than about 250 centistokes at −65° F., have good hydrolytic stability and fire resistance, and have a reduced shrinkage effect on rubber-O-ring seals as compared to the orthosilicate itself.

The tetraalkyl orthosilicates employed as the base material in the invention composition are those having straight chain or branched chain alkyl groups containing 5 to 6 carbon atoms. For example, such alkyl groups can be pentyl, methyl-butyl, ethyl-propyl, hexyl, ethyl-butyl, methyl-pentyl, and the like. If desired, the othosilicate esters employed in the invention composition can contain mixed alkyl groups of from 5 to 6 carbon atoms. In preferred practice, the orthosilicates employed herein should have a viscosity at −65° F. not in excess of about 197 centistokes.

The preferred orthosilicate esters employed in the invention composition are the branched chain alkyl orthosilicates, due to their greater hydrolytic and thermal stability. Also, preferably, orthosilicates are employed containing 6 carbon atoms in the alkyl groups. Mixtures of the above-described orthosilicates can also be employed. Illustrative of the latter are tetraalkyl orthosilicates containing, for example, an average of 2 to 3 alkyl groups containing 6 carbon atoms, and 1 to 2 alkyl groups containing 5 carbon atoms.

Specific examples of orthosilicates which can be used in the invention composition include tetra (n-pentyl) silicate, tetra (n-hexyl) silicate, tetra (2-methyl-1-butyl) silicate, tetra (2-methyl-2-butyl) silicate, tetra (4-methyl-2-pentyl) silicate, tetra (2-ethyl-butyl) silicate, the latter compound being a particularly suitable orthosilicate.

The above-noted tetraalkyl orthosilicate esters used as the major component of the cooling fluids of the invention are not useful alone as a heat transfer medium or coolant, despite their excellent low viscosity and low volatility. In the first place, such silicates are susceptible to hydrolysis. When used as a cooling, circulating medium and pumped in the presence of water or moisture, they react to form gels of $SiO_2$ which hinder flow of the fluids and cause wear in the pump. Secondly, the silicates, if used alone as a cooling medium, tend to extract the plasticizer from many types of rubber such as those used in the O-ring seals in cooling liquid systems, causing the rings to shrink and leak.

Addition of the polyalkylene glycol material, preferably the polyalkylene glycol di-ether, in certain very small proportions noted below, to the above-noted silicates overcomes the above-noted defects of the orthosilicate when used alone, without materially increasing the desirable low viscosity of such silicates. Thus, such polyalkylene glycol materials are miscible with the silicates over a wide temperature range, their own viscosity and volatility are low, they are substantially hydrophobic, and impart this important characteristic to the mixture, and the addition of such polyalkylene glycols greatly inhibits or prevents shrinkage of O-ring seals employed in cooling systems.

Although polyalkylene glycols having one or more free hydroxyl terminal groups can be employed, the preferred polyalkylene glycol materials are those in which one or both of the terminal hydroxy groups have been removed to form ether groups, providing mono- or di-ether derivatives, or combinations thereof. The most desirable materials for purposes of the invention are the diethers. A particularly satisfactory material has been found to be the butyl, ethyl di-ether of polypropylene glycol.

The polyalkylene glycol materials employed in the invention composition preferably are substantially hydrophobic materials. It is preferred not to employ those polyalkylene glycols that are to any significant extent water miscible and which would accordingly tend to dissolve water at one temperature and crystallize water out at lower temperatures. Also, in order to maintain as low a viscosity of the cooling fluid as possible, the glycols employed should have a molecular weight not above about 1,000, preferably between about 400 and about 800, e.g. about 600 to about 800. In preferred practice, the polyalkylene glycol component, e.g. the polyalkylene glycol diether, should have a viscosity at −40° F. not in excess of about 860 centistokes. Also, it is desirable that the polyalkylene glycol component employed be of a type which tends to supercool and to remain light at temperatures down to about −65° F.

The ether end groups on the polyalkylene glycol materials are preferably oxyalkyl groups, the alkyl radicals of which can range from 1 to about 8 atoms in length. The longer chain alkyl groups having in excess of 4 carbon atoms, e.g., pentyl, hexyl, heptyl and octyl, are not preferred because polyalkylene glycol ethers of this type have increased viscosity. It is preferred to employ one or more end alkyl groups in the polyalkylene glycol mono- or di-ether, which have from 1 to 4 carbon atoms. Thus, preferred end alkyl groups are, for example, methyl ethyl, n-propyl, isopropyl, n-butyl, isobutyl, and the like. It is often desirable that one of the end alkyl groups be an ethyl radical while the other end alkyl group of the diether be, for example, a propyl or butyl radical.

The alkylene groups of the polyalkylene glycol material can be an ethylene or propylene group, or mixtures thereof, that is, copolymers containing ethylene and propylene groups. The propylene polymers are preferred over the ethylene polymers, because of the increased water solubility of the ethylene polymers.

Particularly satisfactory polyalkylene glycol materials for purposes of the invention are the n-butyl ethyl, isobutyl ethyl, n-propyl ethyl and isopropyl ethyl diethers of polypropylene glycol.

The preferred polyalkylene glycol materials employed in the invention composition can be produced in known manner from the 1,2-alkylene glycols. Thus, for example, polypropylene glycol materials are prepared by reacting 1,2-propylene oxide and the corresponding alkylene glycol to form poly-1,2-propylene glycol derivatives, and one or both terminal hydroxy groups can be removed to provide the above-noted ether groups, either during or after polymerization. The term "polypropylene glycol" employed in the specification and claims is intended to denote and include the above-noted poly-1,2-propylene glycol derivatives.

In order to obtain a cooling fluid having low viscosities less than about 250 centistokes at −65° F., and employing the above described orthosilicates, not more than about 7% by weight of the polyalkylene glycol material is incorporated in the tetraalkyl orthosilicate. Thus, the amount of polyalkylene glycol employed can range from about 2 to about 7%, preferably from about 4% to about 7%, by weight of the cooling fluid composition, the balance of the composition being essentially the above described tetraalkyl orthosilicate. It has been found that even these small amounts of such glycol material are sufficient to stabilize such silicate against hydrolysis and to substantially overcome or reduce its rubber-shrinking tendencies. Not only are the viscosities of the coolant fluid compositions of the invention below 250 centistokes at −65° F., but invention compositions can be selected such that even at low temperatures of the order of about −100° F., such compositions have a sufficiently low viscosity, e.g., less than about 13,000 centistokes, permitting such fluid compositions to be employed as coolants in the very low temperature range of between −65° F. and about −100° F. This is of particular importance in many airborne applications.

The addition of small amounts of other materials such as phenyl alpha naphthyl amine are useful as a further aid to both the tetraalkyl orthosilicate and the polyalkylene glycol materials to reduce the tendency toward any hydrolysis of the silicate and also to inhibit oxidation of the polyalkylene glycol, e.g. the polyalkylene glycol di-ether preferably employed. Additives of this type are incorporated in minor amount, e.g., about 0.05% to about 2%, preferably about 0.1% to about 1%, by weight of the composition.

Although the incorporation of such additives is often desirable, they are not necessary for purposes of the invention.

EXAMPLE 1

Examples of coolant fluid compositions according to the invention are as follows:

Composition A

| | Percent by weight |
|---|---|
| Tetro 2-ethyl butyl orthosilicate having a viscosity of 197 centistokes at −65° F. | 93.5 |
| n-butyl, ethyl, di-ether of polypropylene glycol having a viscosity of 860 centistokes at −40° F. (molecular weight, 650–720), marketed as "Ucon DLB 62E" by Union Carbide Chemical Co. | 6.0 |
| Phenyl alpha naphthylamine | 0.5 |

Composition B

| | |
|---|---|
| Tetra (n-pentyl) orthosilicate | 94 |
| n-butyl, ethyl, di-ether of polypropylene glycol— "Ucon DLB 62E" | 6 |

Composition C

| | |
|---|---|
| Tetra (4-methyl-2-pentyl) orthosilicate | 95 |
| monobutyl ether of polypropylene glycol (molecular weight, 500–800) | 5 |

Composition D

| | |
|---|---|
| Tetra (2-methyl-2-butyl) orthosilicate | 95.5 |
| Di (n-propyl) ether of polypropylene glycol (molecular weight, 500–800) | 4.0 |
| Phenyl alpha naphthylamine | 0.5 |

Composition E

| | |
|---|---|
| Tetra (n-hexyl) orthosilicate | 97.0 |
| n-Propyl, n-butyl diether of polypropylene glycol (molecular weight, 500–800) | 3.0 |

Composition F

| | |
|---|---|
| Tetra (2-ethyl butyl) orthosilicate having a viscosity of 197 centistokes at −65° F. | 92.5 |
| n-Butyl, ethyl, di-ether of polypropylene glycol— "Ucon DLB 62E" | 7.0 |
| Phenyl alpha naphthylamine | 0.5 |

Composition G

| | |
|---|---|
| Tetra (4-methyl-2-pentyl) orthosilicate | 98 |
| n-Butyl ethyl di-ether of polypropylene glycol (molecular weight, 500–800) | 2 |

Composition H

| | |
|---|---|
| Tetra (2-ethyl butyl) orthosilicate | 94 |
| n-Propyl, n-butyl di-ether of polyethylene glycol (molecular weight, 500–800) | 6 |

Composition J

| | |
|---|---|
| Tetra (2-methyl-2-butyl) orthosilicate | 96 |
| Di (n-butyl) ether of polyethylene glycol (molecular weight, 500–800) | 4 |

EXAMPLE 2

Composition A above has the following properties:

TABLE

| | |
|---|---|
| Kinematic viscosity in centistokes at: | |
| 130° F. | 3.19 |
| —65° F. | 230–242 |
| Pour point | below —100° F. |
| Specific gravity 60/60° F. | 0.905 |
| ASTM total acid number | 0.11 |
| Hydrolytic Stability—(10 gms. of product plus 25 ml. H$_2$O refluxed for 24 hours) | Good |
| Dielectric strength at 72° F. and 60 cycles per second volts per mil | 409 |

It is significant from the above table of properties of Composition A, that such composition has viscosity at low temperature of —65° F. of the desired value less than 250 centistokes. Also, fluid Composition A has good hydrolytic stability even when subjected to test conditions far more severe than would be encountered in use of such fluid. Further, Composition A has high dielectric strength, so that if during use as a coolant in an electronic or electrical system, leakage of the fluid onto the electrical equipment occurred, no damage such as shorting or softening of electrical insulation, would result.

EXAMPLE 3

Composition A is circulated through plates to which electronic equipment is attached, then to heat exchangers where the heat picked up by the fluid is dissipated, and back again through the plates. The fluid operates efficiently at temperatures from about —65° F. to about 300° F., and is readily pumped at the low temperatures of the order of —65° F. with a minimum of pump energy.

EXAMPLE 4

Composition A was tested as to its effect on metals of a type often encountered in coolant systems, e.g., in aircraft, by the standard oxidation corrosion test procedure Mil–H–5606, involving contacting the fluid with the respective metals at 250° F. for one week. The following results were obtained:

| Metal: | Weight change mg./cm.$^2$ |
|---|---|
| Al | 0.01 |
| Cu | 0.00 |
| Fe (cadmium plated) | 0.00 |
| Fe | 0.02 |
| Mg | 0.02 |

The above results show that the cooling fluid Composition A of the invention has substantially no oxidative or corrosive effect on the metals tested.

EXAMPLE 5

The effect of fluid Composition A on nitrile rubber O-rings was tested by a seven day immersion of the O-rings in such fluid at 160° F. There was only a 3.25% shrinkage of the rubber seals during this period of contact with fluid Composition A. Such shrinkage is well below the acceptable maximum shrinkage requirements and hence is satisfactory as compared to a shrinkage of between about 15 and about 25% of such O-rings when contacted with the silicate ester alone of Composition A, which is above such maximum acceptable shrinkage. Also, the Shore "A" scale hardness of the O-rings contacted with Composition A in the above test remained unchanged during the above period of immersion of the O-rings.

EXAMPLE 6

Compositions B to J have low viscosity values at temperature of —65° F. below 250 centistokes, and also have other properties similar to those of fluid Composition A, and are similarly useful as circulating cooling fluids in electronic systems and radar equipment.

In summary, I have unexpectedly found that fluid compositions are provided according to the invention having a viscosity at —65° F. of less than about 250 centistokes and having other properties rendering them particularly useful as circulating cooling media at such low temperatures, such compositions comprising a mixture of a tetraalkyl orthosilicate and a polyalkylene glycol material, wherein the tetraalkyl orthosilicate employed contains alkyl groups having five to six carbon atoms and wherein an effective amount not more than about 7% of a polyalkylene glycol material, preferably the di-ether of a polypropylene glycol, is employed.

While I have described particular embodiments of my invention for the purpose of illustration, it should be understood that various modifications and adaptations thereof may be made within the spirit of the invention, as set forth in the appended claims.

I claim:

1. A heat transfer composition consisting essentially of a tetraalkyl orthosilicate having alkyl groups each containing from 5 to 6 carbon atoms, and about 2 to about 7% by weight of said composition, of a polyalkylene glycol material having terminal groups selected from the class consisting of free hydroxyl and ether groups, said ether groups being oxyalkyl groups, wherein the alkyl radicals contain from 1 to about 8 carbon atoms, said alkylene groups being selected from the class consisting of ethylene and propylene radicals, and mixtures thereof, said polyalkylene glycol material having a molecular weight not in excess of about 1,000, said composition having a viscosity at —65° F. of less than about 250 centistokes.

2. A heat transfer composition consisting essentially of a tetraalkyl orthosilicate having alkyl groups each containing from 5 to 6 carbon atoms, and about 2 to about 7% by weight of said composition of a polypropylene glycol ether having a terminal oxyalkyl group wherein the alkyl radicals contain from 1 to about 8 carbon atoms, said polypropylene glycol ether having a molecular weight not in excess of about 1,000, said composition having a viscosity at —65° F. of less than about 250 centistokes.

3. A heat transfer composition as defined in claim 2, wherein said polypropylene glycol ether is a di-ether having a pair of said terminal oxyalkyl groups, wherein the alkyl radicals contain from 1 to about 8 carbon atoms.

4. A heat transfer composition as defined in claim 2, wherein said polypropylene glycol ether is a di-ether having a pair of terminal oxyalkyl groups wherein the alkyl radicals contain from 1 to about 4 carbon atoms.

5. A cooling fluid medium operable at low temperatures, consisting essentially of a tetraalkyl orthosilicate having alkyl groups containing from 5 to 6 carbon atoms, and about 4 to about 7% by weight of said composition of a polypropylene glycol diether having a pair of terminal oxyalkyl groups wherein the alkyl radicals contain from 1 to about 4 carbon atoms, said polypropylene glycol diether having a molecular weight between about 400 and about 800, said composition having a viscosity at —65° F. of less than about 250 centistokes.

6. A cooling fluid composition as defined in claim 5, wherein said alkyl groups of said tetraalkyl orthosilicate are branched-chain alkyls.

7. A cooling fluid medium as defined in claim 6, wherein said alkyl groups of said tetraalkyl orthosilicate each contain 6 carbon atoms.

8. A cooling fluid medium as defined in claim 5, wherein said polypropylene glycol diether is a butyl ethyl diether of polypropylene glycol.

9. A cooling fluid medium operable at temperatures of the order of $-65°$ F., consisting essentially of tetra (2-ethyl butyl) orthosilicate and about 2% to about 7% by weight of an n-butyl ethyl diether of polypropylene glycol having a molecular weight of between about 400 and about 800, said composition having a viscosity at $-65°$ F. less than about 250 centistokes.

10. A cooling fluid medium operable at temperatures of the order of $-65°$ F. consisting essentially of tetra (2-ethyl butyl) orthosilicate, and about 6% by weight of an n-butyl ethyl diether of polypropylene glycol having a molecular weight of between about 600 and about 800, said composition having a viscosity at $-65°$ F. less than about 250 centistokes.

11. A heat transfer composition consisting essentially of a tetraalkyl orthosilicate having alkyl groups each containing from 5 to 6 carbon atoms, and about 2 to about 7% by weight of said composition, of a polyalkylene glycol material having terminal groups selected from the class consisting of free hydroxyl and ether groups, said ether groups being oxyalkyl groups, wherein the alkyl radicals contain from 1 to about 8 carbon atoms, said alkylene groups being selected from the class consisting of ethylene and propylene radicals, and mixtures thereof, said polyalkylene glycol material having a molecular weight not in excess of about 1,000, said orthosilicate having a viscosity at $-65°$ F. not in excess of about 197 centistokes and said polyalkylene glycol material having a viscosity at $-40°$ F. not in excess of about 860 centistokes.

12. A heat transfer composition consisting essentially of a tetraalkyl orthosilicate having alkyl groups each containing from 5 to 6 carbon atoms, and about 2 to about 7% by weight of said composition of a polypropylene glycol diether having terminal oxyalkyl groups wherein the alkyl radicals contain from 1 to about 8 carbon atoms, said polypropylene glycol ether having a molecular weight not in excess of about 1,000, said orthosilicate having a viscosity at $-65°$ F. not in excess of about 197 centistokes and said polypropylene glycol ether having a viscosity at $-40°$ F. not in excess of about 860 centistokes.

References Cited

UNITED STATES PATENTS

| | | | |
|---|---|---|---|
| 2,270,352 | 1/1942 | Sowa | 252—78 |
| 2,698,836 | 1/1955 | Morrell | 252—78 |
| 2,905,642 | 9/1959 | Miller et al. | 252—73 |
| 3,118,841 | 1/1964 | Moreton | 252—78 |
| 2,717,242 | 9/1955 | Foehr | 252—78 X |

OTHER REFERENCES

Gunderson et al., Synthetic Lubricants, Reinhold Publishing Corp., New York, 1962, pp. 93–96, 99.

Hatton, Introduction to Hydraulic Fluids, Reinhold Publishing Corp., New York, 1962, p. 12.

Technical Bulletin, "Ucon" Fluids and Lubricants, Union Carbide Chemicals, 1960, p. 13.

LEON D. ROSDOL, *Primary Examiner.*

STANLEY D. SCHWARTZ, *Assistant Examiner.*